United States Patent
Cui

(10) Patent No.: US 10,690,912 B2
(45) Date of Patent: Jun. 23, 2020

(54) PRISMATIC AR DISPLAY DEVICE

(71) Applicant: GOERTEK TECHNOLOGY CO.,LTD., Qingdao, Shandong (CN)

(72) Inventor: Haiming Cui, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 170 days.

(21) Appl. No.: 15/780,213

(22) PCT Filed: Sep. 29, 2017

(86) PCT No.: PCT/CN2017/104431
§ 371 (c)(1),
(2) Date: May 30, 2018

(87) PCT Pub. No.: WO2019/056409
PCT Pub. Date: Mar. 28, 2019

(65) Prior Publication Data
US 2019/0285883 A1    Sep. 19, 2019

(30) Foreign Application Priority Data

Sep. 19, 2017   (CN) .......................... 2017 1 0847856

(51) Int. Cl.
*G02B 27/01* (2006.01)
*G02B 27/14* (2006.01)
*G02B 27/28* (2006.01)

(52) U.S. Cl.
CPC ....... *G02B 27/0101* (2013.01); *G02B 27/144* (2013.01); *G02B 27/283* (2013.01);
(Continued)

(58) Field of Classification Search
CPC ........ G02B 27/0172; G02B 2027/0178; G02B 27/0176; G02B 27/0101; G02B 2027/0118
(Continued)

(56) References Cited

U.S. PATENT DOCUMENTS

| | | |
|---|---|---|
| 5,886,824 A | 3/1999 | Takahashi |
| 7,529,029 B2 | 5/2009 | Duncan et al. |

(Continued)

FOREIGN PATENT DOCUMENTS

| | | |
|---|---|---|
| CN | 101029968 A | 9/2007 |
| CN | 106154553 A | 11/2016 |

(Continued)

OTHER PUBLICATIONS

KR Office Action dated May 10, 2019 as received in Application No. 10-2018-7015805.
(Continued)

*Primary Examiner* — Mohammed A Hasan
(74) *Attorney, Agent, or Firm* — Maschoff Brennan

(57) ABSTRACT

Some embodiments of the present disclosure provide a prismatic AR display device comprising an LCOS display chip, a polarization beam splitter (PBS), a double cemented lens, a first single lens and a beam splitting prism sequentially arranged along a first axis, and LCOS lighting apparatus arranged on a second axis perpendicular to the first axis and is close to the PBS. A negative lens in the double cemented lens is close to the PBS, and a positive lens in the double cemented lens is close to the first single lens; a first light incident surface of the beam splitting prism is close to the first single lens, and an optical axis of the first light incident surface coincides with that of the first single lens;
(Continued)

and an optical axis of a second light incident surface of the beam splitting prism is perpendicular to that of the first light incident surface.

20 Claims, 4 Drawing Sheets

(52) U.S. Cl.
CPC .............. *G02B 2027/0114* (2013.01); *G02B 2027/0116* (2013.01)

(58) Field of Classification Search
USPC ........................................................ 359/630
See application file for complete search history.

(56) References Cited

U.S. PATENT DOCUMENTS

| | | | |
|---|---|---|---|
| 9,535,256 B2 | 1/2017 | Carls et al. | |
| 9,784,985 B2 | 10/2017 | Poon et al. | |
| 10,282,906 B2 | 5/2019 | Yonekubo | |
| 2006/0082731 A1* | 4/2006 | Drazic | H04N 5/7441 |
| | | | 353/7 |
| 2006/0103812 A1* | 5/2006 | Liao | G03B 21/28 |
| | | | 353/81 |
| 2014/0293434 A1* | 10/2014 | Cheng | G02B 27/225 |
| | | | 359/630 |
| 2016/0131903 A1 | 5/2016 | Kollin | |
| 2016/0154245 A1 | 6/2016 | Gao et al. | |
| 2017/0255017 A1 | 9/2017 | Haseltine | |
| 2018/0039065 A1 | 2/2018 | Iwai | |

FOREIGN PATENT DOCUMENTS

| | | |
|---|---|---|
| CN | 205787364 U | 12/2016 |
| CN | 106773068 A | 5/2017 |
| CN | 107148592 A | 9/2017 |
| JP | 2014-506340 A | 3/2014 |
| JP | 2016-151626 A | 8/2016 |
| KR | 10-2008-0045159 A | 5/2008 |
| KR | 10-2014-0081885 A | 7/2014 |
| KR | 10-2014-0098203 A | 8/2014 |
| KR | 10-2015-0024580 A | 3/2015 |
| KR | 10-2015-0112852 A | 10/2015 |
| WO | 2016-151626 A1 | 9/2016 |

OTHER PUBLICATIONS

Chinese Office Action issued in corresponding application No. 2018-529174, dated Oct. 24, 2019.
Korean Office Action issued in corresponding application No. 10-2018-7015805, dated Oct. 28, 2019.

* cited by examiner

PRISMATIC AR DISPLAY DEVICE

CROSS-REFERENCE TO RELATED APPLICATIONS

The present application is the U.S. national stage of International Application No. PCT/CN2017/104431, filed on Sep. 29, 2017, which claims priority to Chinese Patent Application No. 201710847856.6 entitled "Prismatic AR Display Device" filed on Sep. 19, 2017, both of which are incorporated herein by reference in their entirety.

TECHNICAL FIELD

The present disclosure relates to AR, and more particularly, to a prismatic AR display device.

BACKGROUND

The augmented reality (referred as "AR" hereafter) is a technique that calculates the positions and angles of camera images and incorporates corresponding images, videos or 3D models. This kind of technology superimposes virtual information onto real-world scenes so as to achieve the integration of the real-world information with the virtual-world one.

SUMMARY

Some embodiments of the present disclosure provide a prismatic AR display device, comprising:

an LCOS display chip, a polarization beam splitter (PBS), a double cemented lens, a first single lens and a beam splitting prism which are sequentially arranged along a first axis, and LCOS lighting apparatus which is arranged on a second axis perpendicular to the first axis and close to the PBS, the double cemented lens comprises a positive lens and a negative lens, the negative lens is close to the PBS, and the positive lens is close to the first single lens;

a first light incident surface of the beam splitting prism is close to the first single lens, and an optical axis of the first light incident surface coincides with that of the first single lens; an optical axis of a second light incident surface of the beam splitting prism is perpendicular to the optical axis of the first light incident surface, and the second light incident surface is opposite to a first light emergent surface;

the LCOS lighting apparatus is used for illuminating the LCOS display chip, such that the LCOS display chip emits virtual image light; after being transmitted by the PBS and refracted by the double cemented lens, the virtual image light emitted by the LCOS display chip enters the first single lens, and is refracted to the beam splitting prism by the first single lens; then, on a beam splitting surface of the beam splitting prism, the refracted light is combined with ambient light from the second light incident surface of the beam splitting prism and the combined light is transmitted to human eyes from the first light emergent surface of the beam splitting prism.

BRIEF DESCRIPTION OF THE DRAWINGS

The drawings described herein are used for providing a further understanding of the present disclosure, and constitute part of the present disclosure. The exemplary embodiments of the present disclosure and description thereof are used for explaining the present disclosure, and do not constitute improper limitations thereon. In the drawings.

DESCRIPTION OF THE EMBODIMENTS

To make the object, technical solutions and advantages of the present disclosure clearer, the technical solutions of the present disclosure will be described below in combination with the some embodiments of the present disclosure and corresponding accompanying drawings. It is obvious that the described embodiments only constitute some of the embodiments of the present disclosure, instead of all of the embodiments thereof. Based on the embodiments in the present disclosure, all the other embodiments obtained by those of ordinary skill in the art without inventive efforts shall be covered by the scope of protection of the present disclosure.

Figure 2:
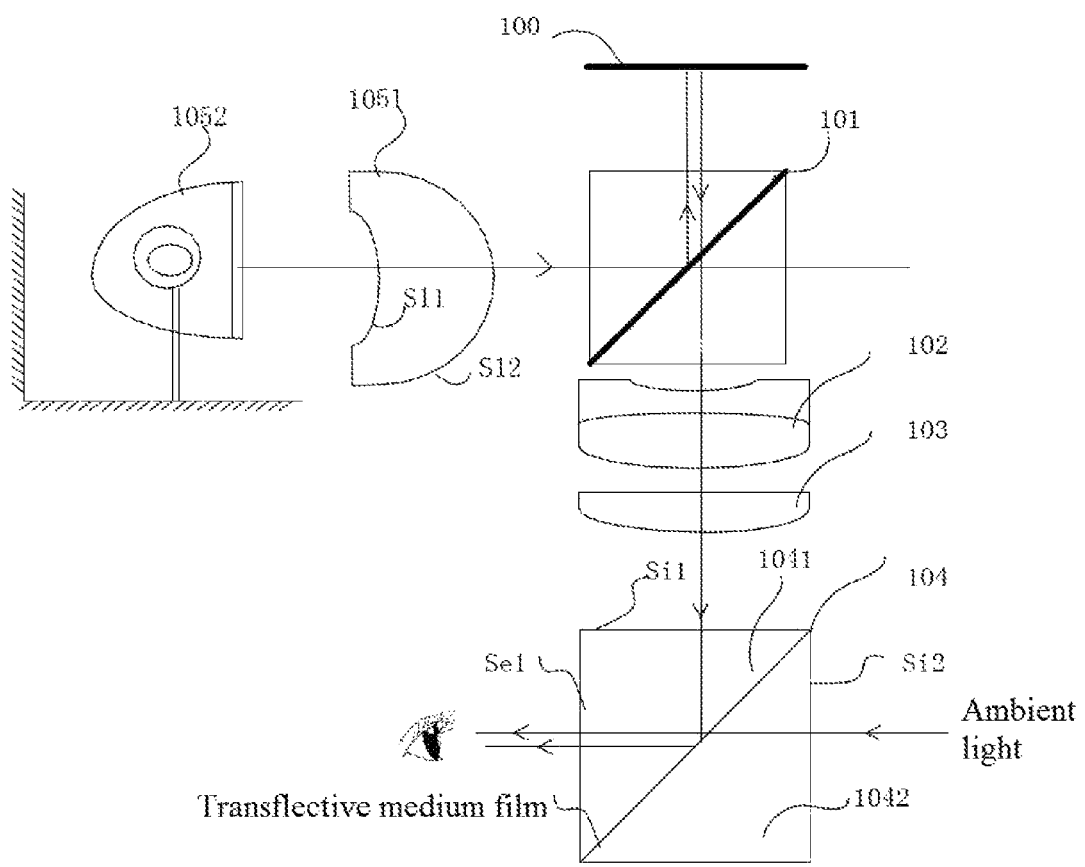
FIG. 2 is a schematic diagram illustrating the structure of a prismatic AR display device provided by some embodiments of the present disclosure.

FIG. 2 is a schematic diagram illustrating the structure of a prismatic AR display device provided by some embodiments of the present disclosure. As shown in FIG. 2, the prismatic AR display device comprises:

an LCOS display chip 100, a polarization beam splitter (PBS) 101, a double cemented lens 102, a first single lens 103 and a beam splitting prism 104 which are sequentially arranged along a first axis, and LCOS lighting apparatus which is arranged on a second axis perpendicular to the first axis and close to the PBS 101. In some embodiments, both the first axis and the second axis may be perpendicular to a light incident surface of the PBS 101 and pass through the geometric center point of the PBS 101, and the two are perpendicular to each other.

In some embodiments, the double cemented lens 102 may be formed by bonding a low-dispersion crown glass positive lens with a high-dispersion flint glass negative lens, and the negative lens in the double cemented lens 102 is close to the PBS 101, and the positive lens is close to the first single lens 103. The double cemented lens 102 can not only eliminate the color difference generated in optical paths, but also deflect light of large divergence angle transmitted by the PBS 101 into that of small divergence angle to be propagated, which can improve the light collecting efficiency of the AR display device.

In some embodiments, the first single lens 103 may be a positive lens. The first single lens 103 is used to cooperate with the double cemented lens 102 to conduct imaging, and share focal power in the optical path system to optimize the optical path structure. Optionally, the material of the first single lens 103 may be different from that of the double cemented lens 102. In other words, the first single lens 103 is neither a flint glass lens nor a crown glass lens. As such, it can further eliminate the color difference produced in optical paths, which can improve the definition of virtual images viewed by human eyes in the end.

The beam splitting prism 104 comprises two light incident surfaces, two light emergent surfaces and one beam splitting surface, and the beam splitting surface may be realized by the transflective medium film.

As shown in FIG. 2, a first light incident surface Si1 of the beam splitting prism 104 is close to the first single lens 103, and its optical axis coincides with that of the first single lens 103; an optical axis of a second light incident surface Si2 of the beam splitting prism 104 is perpendicular to that of the first light incident surface Si1, and the second light incident surface Si2 is opposite to a first light emergent surface Se1.

It should be noted that in the above or following embodiments of the present disclosure, the LCOS display chip 100 cited herein is a kind of display chip that can't emit light independently, which needs to be illuminated by polarized light to exhibit pictures of different gray scales and colors. In some embodiments of the present disclosure, the PBS 101 is used to cooperate with the LCOS lighting apparatus 105 to generate linearly polarized light to achieve illumination of the LCOS display chip 100. In the display device shown in FIG. 2, upon transmission by the PBS 101 and refraction by the double cemented lens 102, the virtual image light emitted by the LCOS display chip 100 enters the first single lens 103 where it is refracted to the beam splitting prism 104 by the first single lens 103; then, it is combined, on a beam splitting surface of the beam splitting prism 104, with ambient light from the second light incident surface Si2 of the beam splitting prism 104; thereafter, the combined light is transmitted to human eyes from the first light emergent surface Se1 of the beam splitting prism 104. As such, the virtual images superimposed with real ambient images can be viewed by human eyes from the light emergent side of the first light emergent surface Se1.

In the prismatic AR display device provided by some embodiments of the present disclosure, the imaging optical path comprises the double cemented lens 102 and the first single lens 103 that are coaxially arranged in order, and the beam-splitting and combining optical path is realized by the beam splitting prism 104. On one hand, in such optical path design, the double cemented lens 102 can correct the color difference generated by the imaging optical path and the beam-splitting and combining optical path while conducting imaging on the virtual image light emitted by the LCOS display chip 100, which reduces the color difference of virtual images, which can improve the definition of aliased images viewed by human eyes. On the other hand, the imaging optical path formed by the double cemented lens 102 and the first single lens 103 comprises, in total, five optical surfaces having certain curvature radiuses. This ensures that the imaging optical path has a sufficiently large field angle, and that this field angle may be adjusted according to imaging requirements. Besides, without the functions of beam splitting and beam combining, the beam splitting prism 104 may be equivalently regarded as a parallel plate glass having a certain thickness for shortening optical paths to optimize the structure of the display device.

In some embodiments, as shown in FIG. 2, the beam splitting prism 104 comprises a first prism 1041 and a second prism 1042 that are sequentially arranged, wherein a slant facet of the first prism 1041 is cemented to that of the second prism 1042, and a cemented surface is plated thereon with a transflective medium film to form a beam splitting surface of the beam splitting prism 104.

In such structure, the first light incident surface Si1 may be a surface on the first prism 1041 which is close to the first single lens 103 and whose optical axis coincides with that of the first single lens 103; the first light emergent surface Se1 may be a surface on the first prism 1041 whose optical axis is perpendicular to that of the first single lens 103; the second light incident surface Si2 may be a surface on the second prism 1042 whose optical axis is perpendicular to that of the first single lens 103.

Virtual image light refracted by the first single lens 103 is incident on the beam splitting surface through the first light incident surface Si1 on the first prism 1041, which is then reflected to the first light emergent surface Se1 on the first prism 1041 via the beam splitting surface; at the same time, ambient light is incident on the beam splitting surface through the second light incident surface Si2 on the second prism 1042, which is then transmitted to the first light emergent surface Se1 on the first prism 1041 via the beam splitting surface. As such, virtual-real aliasing images can be viewed by human eyes from the light emergent side of the first light emergent surface Se1.

Figure 1:
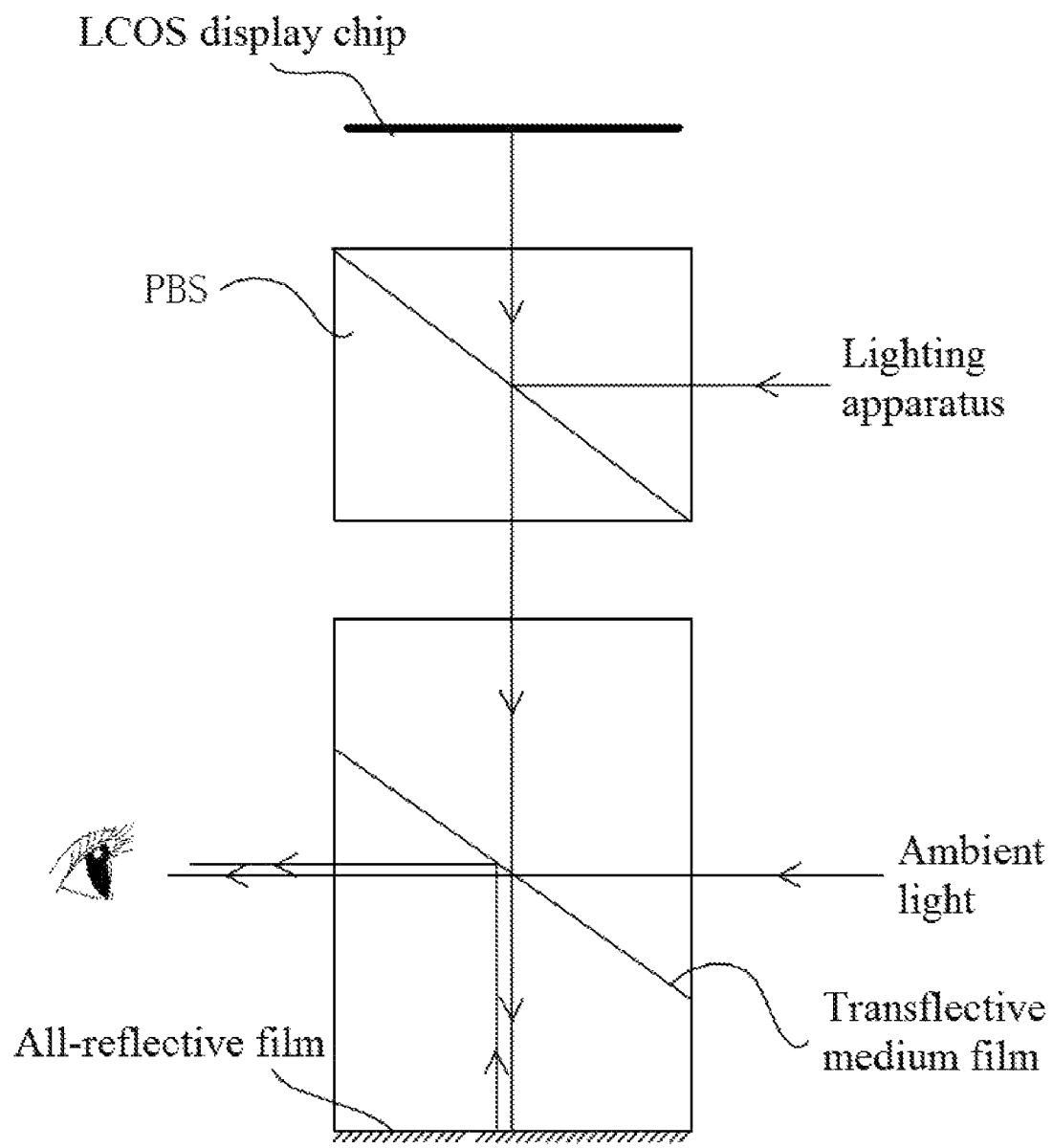
FIG. 1 is a schematic diagram illustrating the structure of a prismatic AR display device in the related art.

In the above process, the virtual image light refracted by the first single lens 103 is required to pass through the beam splitting surface of the beam splitting prism 104 only once before it reaches human eyes, and thus, its optical efficiency is 50%. In the optical paths shown in FIG. 1, the virtual image light passes through the beam splitting surface of the beam splitting prism twice, and thus, its optical efficiency is only 25%. Therefore, with respect to the related art, the present disclosure can greatly improve the optical efficiency of virtual images during their imaging, which, under the condition of enabling human eyes to view virtual images of equal brightness, reduces the power consumption required by the LCOS lighting apparatus for illuminating the LCOS display chip 100.

Figure 3:
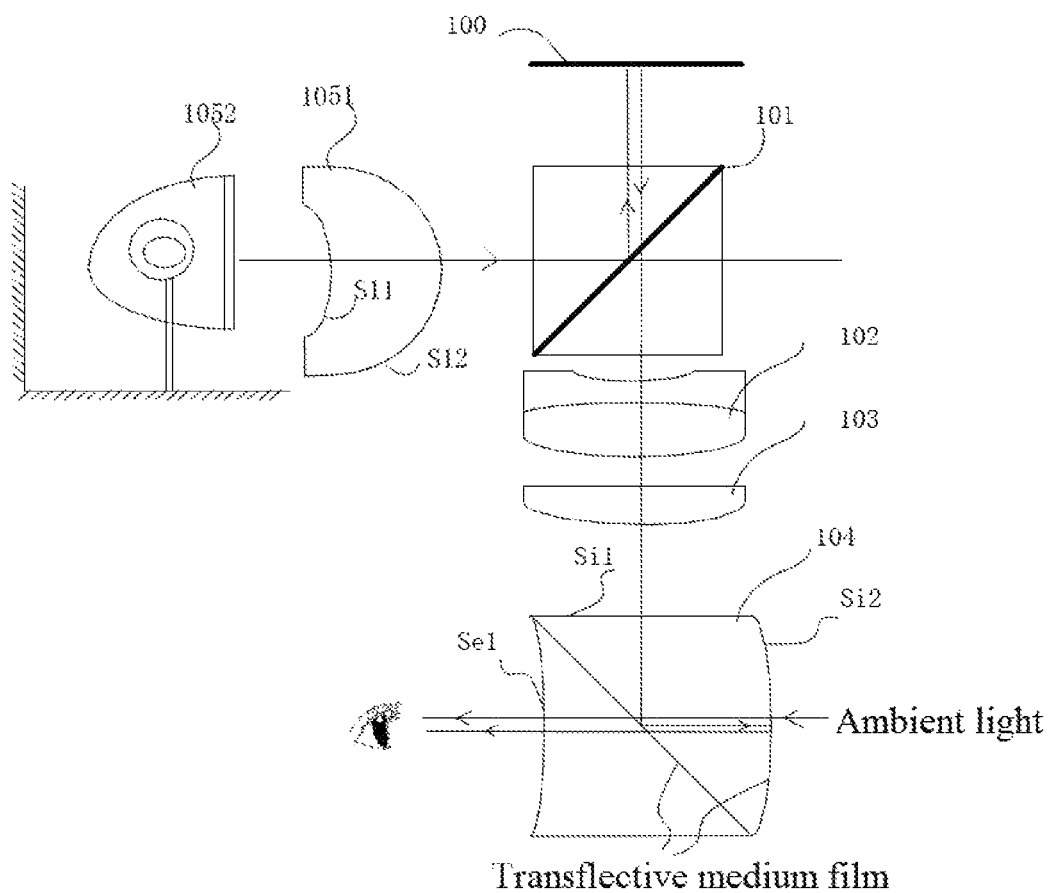
FIG. 3 is a schematic diagram illustrating the structure of a prismatic AR display device provided by some embodiments of the present disclosure.

In some embodiments, as shown in FIG. 3, the beam splitting prism 104 comprises a second prism 1042 and a first prism 1041 that are sequentially arranged, wherein a slant facet of the second prism 1042 is cemented to that of the first prism 1041, and a cemented surface is plated thereon with a transflective medium film for forming a beam splitting surface of the beam splitting prism 104.

The first light incident surface Si1 may be a surface on the second prism 1042 which is close to the first single lens 103 and whose optical axis coincides with that of the first single lens 103; the second light incident surface Si2 may be a surface on the second prism 1042 whose optical axis is perpendicular to that of the first single lens 103, and the second light incident surface Si2 is a convex surface and plated with the transflective medium film; the first light emergent surface Se1 may be a surface on the first prism 1041 whose optical axis is perpendicular to that of the first single lens 103.

In this kind of structure, virtual image light refracted by the first single lens 103 is incident on the beam splitting surface through the first light incident surface Si1 on the second prism 1042; then, it is reflected to the second light incident surface Si2 on the second prism 1042 via the beam splitting surface; thereafter, this light is reflected to the beam splitting surface by the second light incident surface Si2, and then transmitted to the first light emergent surface Se1 on the first prism 1041 via the beam splitting surface. At the same time, ambient light is incident on the beam splitting surface through the second light incident surface Si2 on the second prism 1042, which is then transmitted to the first light emergent surface Se1 on the first prism 1041 via the beam splitting surface. As such, virtual-real aliasing images can be viewed by human eyes from the light emergent side of the first light emergent surface Se1.

In the above process, the second light incident surface Si2 is a convex surface and plated with the transflective medium film, which can collimate light incident thereon to form amplified images. The virtual image light after collimation is more concentrated in energy, which can improve the definition of virtual images viewed by a user.

As shown in FIG. 3, in some embodiments, the first light emergent surface Se1 is a concave surface concentric with the second light incident surface Si2, and its curvature radius is the same as that of the second light incident surface Si2, such that effective regions of the beam splitting prism 104 are equal in thickness. As such, the distortion of ambient light is reduced, and the quality of ambient light viewed by human eyes is improved.

In some embodiments, the PBS 101 may be cemented by a pair of high-precision rectangular prisms. A ramped surface of one of the rectangular prisms is plated thereon with a polarization beam splitting medium film capable of splitting an incident non-polarized light into two linearly polarized light beams perpendicular to each other. Here, the horizontally polarized light (P light) passes through the film completely, while the vertically polarized light (S light) is reflected out at an angle of 45 degrees. In other words, the emergent directions of the S polarized light and the P polarized light form an angle of 90 degrees.

As shown in FIGS. 2 and 3, the LCOS display chip 100 and the LCOS lighting apparatus 105 may be arranged on two adjacent sides of the PBS 101. For example, the LCOS display chip 100 is arranged on the first axis, and the LCOS lighting apparatus 105 is arranged on the second axis. Here, the LCOS lighting apparatus 105 comprises a concavo-convex lens 1051 and a light source device 1052 that are sequentially arranged along the second axis.

Non-polarized light of large divergence angle emitted by the light source device 1052 first enters the concavo-convex lens 1051 where it is refracted, via the concavo-convex lens 1051, into light with small divergence angle; then, such light with small divergence angle enters the PBS 101, and is polarized by the polarization beam splitting medium film of the PBS 101; thereafter, one of the linearly polarized light beams may illuminate the LCOS display chip 100 so that the LCOS display chip 100 may exhibit pictures of different gray scales and colors. In the above or following embodiments of the present disclosure, the virtual image light emitted by the LCOS display chip 100 should be construed as the light reflected by the LCOS display chip 100 through the above illumination process, and detailed description thereof will be omitted.

Here, a first surface S11 of the concavo-convex lens 1051 close to the light source device 1052 is a concave spherical surface, and a second surface S12 away from the light source device 1052 is a convex spherical surface. After light emitted by the light source device 100 is incident on the first surface S11, the light is deflected into small-angled light to be incident on the second surface S12. In order to ensure light collecting efficiency, the second surface S12 is a convex spherical surface in the shape of nearly a semispherical surface, such that when the curvature radius is determined, the second surface S12 has a maximum numerical aperture. As such, the light flux of the second surface S12 is increased so as to propagate light refracted thereon by the first surface S11 as much as possible. In addition, as a convex spherical surface, the second surface S12 can endow light emitted out of the concavo-convex lens 1051 with a smaller divergence angle to control the angle of the illuminative light spot reaching the LCOS display chip 100 to be within a reasonable range. Alternatively, when the concavo-convex lens 1051 is determined, the curvature radius of the second surface S12 may be designed to be twice that of the first surface S11.

Figure 4:
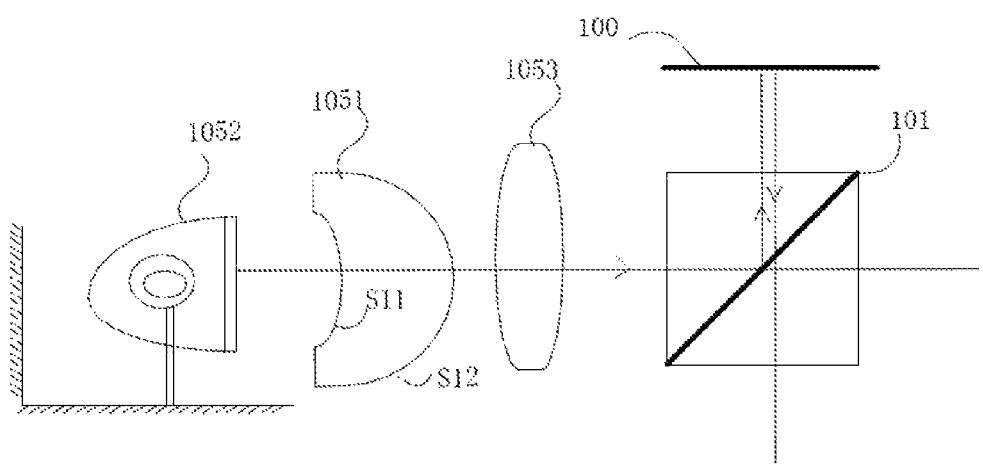
FIG. 4 is a schematic diagram illustrating the structure of LCOS lighting apparatus provided by some embodiments of the present disclosure.

In the LCOS lighting apparatus 105 provided in the above embodiments, the adoption of the concavo-convex lens 1051 can achieve a high lighting efficiency. However, in some possible cases, as limited by the encapsulation structure of the light source device 1052, the light source device 1052 gives out light inhomogeneously, thus leading to poor uniformity in the light illuminated on the display area of the LCOS display chip 100. In order to improve the uniformity of illumination for the LCOS display chip 100, the present disclosure also sets forth an LCOS lighting apparatus as shown in FIG. 4. As shown in FIG. 4, this apparatus further comprises an aspherical positive lens 1053.

The aspherical positive lens 1053 is located between the concavo-convex lens 1051 and the PBS 101, and coaxial with the concavo-convex lens 1051. In some embodiments, the light emitted by the light source device 1052 may be deflected, by the concavo-convex lens 1051, into that of small divergence angle before it is incident on the aspherical positive lens 1053. The aspherical positive lens 1053 can uniformly refract the light emitted by the light source device 1052 and refracted thereon by the concavo-convex lens 1051 to the PBS 101 where it is polarized by the PBS 101 and then enters the LCOS display chip 100.

Here, the aspherical positive lens 1053 has a curvature radius continuously changes from the center to the edge, and its focal power is positive. As such, the direction of each emergent light ray can be accurately controlled, such that light may reach specified positions on the target plane upon being deflected. In this manner, illuminative light spots are ensured to be distributed fairly uniformly on the LCOS display chip.

In the above or following embodiments of the present disclosure, the first light incident surface Si1 and/or the second light incident surface Si2 may be plated with an anti-reflection film. If the first light incident surface Si1 is plated thereon with an anti-reflection film, the intensity of the virtual image light incident on the first light incident surface Si1 can be increased, such that the virtual images viewed by human eyes are clearer. Similarly, if the second light incident surface Si2 is plated thereon with an anti-reflection film, the intensity of ambient light incident on the second light incident surface Si2 can be increased, such that the true ambient images viewed by human eyes are clearer.

In some embodiments of the present disclosure, the first light incident surface Si1 and/or the second light incident surface Si2 may be a concave surface to enhance its light collecting capability. For example, if the first light incident surface Si1 is a concave surface, the first light incident surface Si1 can propagate the virtual image light emitted by the LCOS display chip 100 at a high light collecting efficiency even though the display area of the LCOS display chip 100 is augmented.

In the above or following embodiments of the present disclosure, the transflective medium film in the beam splitting prism 104 can transmit part of the virtual image light incident through the first light incident surface Si1 to the second light emergent surface Se2 of the beam splitting prism 104, wherein the second light emergent surface Se2 is the surface in the beam splitting prism 104 opposite to the first light incident surface Si1. In some possible cases, the light emergent side of the second light emergent surface Se2 is unobstructed, which is likely to let out virtual images, thus undermining privacy of a user.

Figure 5:
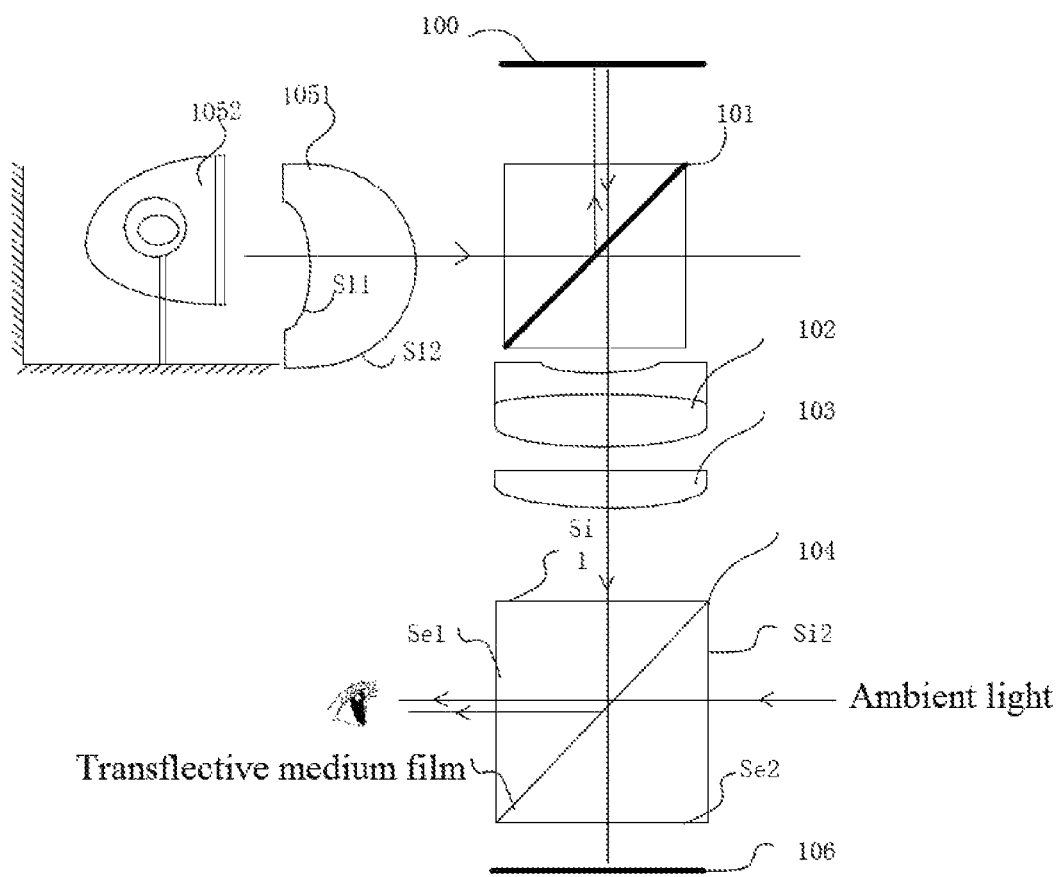
FIG. 5 is a schematic diagram illustrating the structure of a prismatic AR display device provided by still some embodiments of the present disclosure.

In some embodiments, as shown in FIG. 5, the prismatic AR display device provided by the present disclosure may further comprise a polarization element 106. The polarization element 106 is located on the light emergent side of the second light emergent surface Se2, and the polarization direction of the polarization element 106 is perpendicular to that of the PBS 101. As such, the polarization element 106 may eliminate the polarized virtual image light transmitted out of the second light emergent surface Se2, which avoids letting out virtual images viewed by a user, thus protecting the privacy of the user and improving user experience.

In some embodiments, the polarization element 106 may be an optical element separate from the beam splitting prism 104, e.g., a polarization plate. In some embodiments, the polarization element 106 may be designed integrally with the beam splitting prism. For example, the second light emergent surface Se2 of the beam splitting prism 104 may be plated with a polarization medium film to further optimize the volume of the display device while achieving light elimination.

With the above embodiments, some embodiments of the present disclosure provides prismatic AR display apparatus comprising any one of the prismatic AR display devices described in the above embodiments. Accordingly, this apparatus has such advantages as small imaging color difference, large field angle and high optical efficiency.

It should be noted that such descriptions as "first" and "second" in this document are used to distinguish between different optical elements and the like. They do not represent the sequential order of the optical elements in optical paths, nor do they define that "first" and "second" are different types.

Finally, it should be noted that the above embodiments are used merely to explain the technical solutions of the present disclosure, instead of as limitations thereon; although the present disclosure has been described in detail with reference to the foregoing embodiments, those of ordinary skill in the art should understand that modifications can still be made to the technical solution as set forth in each of the foregoing embodiments or some of the technical features in the technical solutions may be equally substituted; and these modifications or substitutions do not lead to the departure of the nature of a corresponding technical solution from the spirit and scope of the technical solutions as set forth in various embodiments of the present disclosure.

The invention claimed is:

1. A prismatic AR display device, comprising:
    an LCOS display chip, a polarization beam splitter (PBS), a double cemented lens, a first single lens and a beam splitting prism which are sequentially arranged along a first axis, and LCOS lighting apparatus which is arranged on a second axis perpendicular to the first axis and is close to the PBS,
    the double cemented lens comprises a positive lens and a negative lens, the negative lens is close to the PBS, and the positive lens is close to the first single lens;
    a first light incident surface of the beam splitting prism is close to the first single lens, and an optical axis of the first light incident surface coincides with an optical axis of the first single lens; an optical axis of a second light incident surface of the beam splitting prism is perpendicular to the optical axis of the first light incident surface, and the second light incident surface is opposite to a first light emergent surface;
    the LCOS lighting apparatus is used for illuminating the LCOS display chip, such that the LCOS display chip emits virtual image light; after being transmitted by the PBS and refracted by the double cemented lens, the virtual image light emitted by the LCOS display chip enters the first single lens, and is refracted to the beam splitting prism by the first single lens.

2. The device according to claim 1, wherein after being transmitted by the PBS, the virtual image light emitted by the LCOS display chip directly enters the double cemented lens, and
    after being refracted by the double cemented lens, the virtual image light transmitted by the PBS enters the first single lens which is a positive lens.

3. The device according to claim 2, the beam splitting prism comprising a first prism and a second prism that are sequentially arranged, wherein:
    a slant facet of the first prism is cemented to a slant facet of the second prism, and a cemented surface is plated thereon with a transflective medium film to form a beam splitting surface of the beam splitting prism;
    the first light incident surface is a surface on the first prism which is close to the first single lens and whose optical axis coincides with the optical axis of the first single lens;
    the first light emergent surface is a surface on the first prism whose optical axis is perpendicular to the optical axis of the first single lens; and
    the second light incident surface is a surface on the second prism whose optical axis is perpendicular to the optical axis of the first single lens.

4. The device according to claim 2, the beam splitting prism comprising a first prism and a second prism that are sequentially arranged, wherein:
    a slant facet of the first prism is cemented to a slant facet of the second prism, and a cemented surface is plated thereon with a transflective medium film to form a beam splitting surface of the beam splitting prism;
    the first light incident surface is a surface on the first prism which is close to the first single lens and whose optical axis coincides with the optical axis of the first single lens;
    the first light emergent surface is a surface on the first prism whose optical axis is perpendicular to the optical axis of the first single lens; and
    the second light incident surface is a surface on the second prism whose optical axis is perpendicular to the optical axis of the first single lens.

5. The device according to claim 2, the beam splitting prism comprising a second prism and a first prism that are sequentially arranged, wherein:
    a slant facet of the second prism is cemented to a slant facet of the first prism, and a cemented surface is plated thereon with a transflective medium film to form a beam splitting surface of the beam splitting prism;
    the first light incident surface is a surface on the second prism which is close to the first single lens and whose optical axis coincides with the optical axis of the first single lens;
    the second light incident surface is a surface on the second prism whose optical axis is perpendicular to the optical axis of the first single lens, and the second light incident surface is a convex surface and is plated with the transflective medium film; and
    the first light emergent surface is a surface on the first prism whose optical axis is perpendicular to the optical axis of the first single lens.

6. The device according to claim 1, wherein at least one of the first light incident surface and the second light incident surface we is plated with an anti-reflection film.

7. The device according to claim 6, the beam splitting prism comprising a second prism and a first prism that are sequentially arranged, wherein:
- a slant facet of the second prism is cemented to a slant facet of the first prism, and a cemented surface is plated thereon with a transflective medium film to form a beam splitting surface of the beam splitting prism;
- the first light incident surface is a surface on the second prism which is close to the first single lens and whose optical axis coincides with the optical axis of the first single lens;
- the second light incident surface is a surface on the second prism whose optical axis is perpendicular to the optical axis of the first single lens, and the second light incident surface is a convex surface and is plated with the transflective medium film; and
- the first light emergent surface is a surface on the first prism whose optical axis is perpendicular to the optical axis of the first single lens.

8. The device according to claim 1, further comprising a polarization element, wherein:
- the polarization element is located on a light emergent side of a second light emergent surface of the beam splitting prism, and a polarization direction of the polarization element is perpendicular to a polarization direction of the PBS; and
- the second light emergent surface is opposite to the first light incident surface.

9. The device according to claim 8, the beam splitting prism comprising a first prism and a second prism that are sequentially arranged, wherein:
- a slant facet of the first prism is cemented to a slant facet of the second prism, and a cemented surface is plated thereon with a transflective medium film to form a beam splitting surface of the beam splitting prism;
- the first light incident surface is a surface on the first prism which is close to the first single lens and whose optical axis coincides with the optical axis of the first single lens;
- the first light emergent surface is a surface on the first prism whose optical axis is perpendicular to the optical axis of the first single lens; and
- the second light incident surface is a surface on the second prism whose optical axis is perpendicular to the optical axis of the first single lens.

10. The device according to claim 8, the beam splitting prism comprising a second prism and a first prism that are sequentially arranged, wherein:
- a slant facet of the second prism is cemented to a slant facet of the first prism, and a cemented surface is plated thereon with a transflective medium film to form a beam splitting surface of the beam splitting prism;
- the first light incident surface is a surface on the second prism which is close to the first single lens and whose optical axis coincides with the optical axis of the first single lens;
- the second light incident surface is a surface on the second prism whose optical axis is perpendicular to the optical axis of the first single lens, and the second light incident surface is a convex surface and is plated with the transflective medium film; and
- the first light emergent surface is a surface on the first prism whose optical axis is perpendicular to the optical axis of the first single lens.

11. The device according to claim 1, wherein at least one of the first light incident surface and the second light incident surface is concave surfaces.

12. The device according to claim 11, the beam splitting prism comprising a first prism and a second prism that are sequentially arranged, wherein:
- a slant facet of the first prism is cemented to a slant facet of the second prism, and a cemented surface is plated thereon with a transflective medium film to form a beam splitting surface of the beam splitting prism;
- the first light incident surface is a surface on the first prism which is close to the first single lens and whose optical axis coincides with the optical axis of the first single lens;
- the first light emergent surface is a surface on the first prism whose optical axis is perpendicular to the optical axis of the first single lens; and
- the second light incident surface is a surface on the second prism whose optical axis is perpendicular to the optical axis of the first single lens.

13. The device according to claim 1, the beam splitting prism comprising a first prism and a second prism that are sequentially arranged, wherein:
- a slant facet of the first prism is cemented to a slant facet of the second prism, and a cemented surface is plated thereon with a transflective medium film to form a beam splitting surface of the beam splitting prism;
- the first light incident surface is a surface on the first prism which is close to the first single lens and whose optical axis coincides with the optical axis of the first single lens;
- the first light emergent surface is a surface on the first prism whose optical axis is perpendicular to the optical axis of the first single lens; and
- the second light incident surface is a surface on the second prism whose optical axis is perpendicular to the optical axis of the first single lens.

14. The device according to claim 1, the beam splitting prism comprising a second prism and a first prism that are sequentially arranged, wherein:
- a slant facet of the second prism is cemented to a slant facet of the first prism, and a cemented surface is plated thereon with a transflective medium film to form a beam splitting surface of the beam splitting prism;
- the first light incident surface is a surface on the second prism which is close to the first single lens and whose optical axis coincides with the optical axis of the first single lens;
- the second light incident surface is a surface on the second prism whose optical axis is perpendicular to the optical axis of the first single lens, and the second light incident surface is a convex surface and is plated with the transflective medium film; and
- the first light emergent surface is a surface on the first prism whose optical axis is perpendicular to the optical axis of the first single lens.

15. The device according to claim 14, wherein the first light emergent surface is a concave surface that is concentric with the second light incident surface and has the same curvature radius as the second light incident surface.

16. The device according to claim 1, the LCOS lighting apparatus comprising a concavo-convex lens and a light source device that are sequentially arranged along the second axis, wherein:
- a first surface of the concavo-convex lens close to the light source device is a concave spherical surface, and a second surface of the concavo-convex lens close to the PBS is a convex spherical surface; and
- light emitted by the light source device is converged to the PBS via the concavo-convex lens, polarized by the PBS, enters the LCOS display chip in the form of an orthogonal linearly polarized light.

17. The device according to claim 16, the LCOS lighting apparatus comprising an aspherical positive lens arranged on the second axis and located between the concavo-convex lens and the PBS, wherein:

the aspherical positive lens is used for uniformly refracting the light that is emitted by the light source device and refracted by the concavo-convex lens to the PBS so that the refracted light is polarized by the PBS and then enters the LCOS display chip.

18. The device according to claim 1, wherein on a beam splitting surface of the beam splitting prism, the refracted light is combined with ambient light from the second light incident surface of the beam splitting prism and the combined light is transmitted to human eyes from the first light emergent surface of the beam splitting prism.

19. The device according to claim 1, wherein a material of the first single lens is different from a material of the double cemented lens.

20. The device according to claim 1, wherein the LCOS lighting apparatus is used for uniformly illuminating the LCOS display chip.

* * * * *